US007231654B2

(12) United States Patent
Murai

(10) Patent No.: US 7,231,654 B2
(45) Date of Patent: Jun. 12, 2007

(54) REMOTE MONITORING METHOD AND MONITOR CONTROL SERVER

(75) Inventor: Nobuo Murai, Chuo-ku (JP)

(73) Assignee: Japan Network Service Co., Ltd., Tokyo (JP)

( * ) Notice: Subject to any disclaimer, the term of this patent is extended or adjusted under 35 U.S.C. 154(b) by 589 days.

(21) Appl. No.: 10/311,690

(22) PCT Filed: Jun. 28, 2001

(86) PCT No.: PCT/JP01/05591

§ 371 (c)(1),
(2), (4) Date: Dec. 19, 2002

(87) PCT Pub. No.: WO02/03348

PCT Pub. Date: Jan. 10, 2002

(65) Prior Publication Data

US 2003/0164877 A1 Sep. 4, 2003

(30) Foreign Application Priority Data

Jun. 30, 2000 (JP) ............................ 2000-199835

(51) Int. Cl.
*H04N 7/173* (2006.01)

(52) U.S. Cl. ...................... 725/105; 725/115; 725/118; 725/117; 348/155; 348/156; 348/14.02; 348/14.05; 348/152; 348/39; 348/151; 340/541; 340/565; 709/203

(58) Field of Classification Search ................ 725/105, 725/112, 115, 117, 118; 348/143, 152, 151, 348/335, 155, 156, 39, 14.02, 14.05; 709/203; 340/541, 565, 540, 555
See application file for complete search history.

(56) References Cited

U.S. PATENT DOCUMENTS 5,031,082 A * 7/1991 Bierend ...................... 362/233
5,283,644 A 2/1994 Maeno
5,489,891 A * 2/1996 Diong et al. ................ 340/567
5,495,288 A * 2/1996 Broady et al. .............. 348/155
5,546,072 A 8/1996 Creuseremee et al.
5,691,765 A * 11/1997 Schieltz et al. ............. 348/335
5,731,785 A 3/1998 Lemelson et al.
5,825,432 A 10/1998 Yonezawa
5,883,890 A * 3/1999 Okanoue et al. ............ 370/338

(Continued)

FOREIGN PATENT DOCUMENTS

JP 06-58676 8/1994

(Continued)

*Primary Examiner*—Shawn S. An
(74) *Attorney, Agent, or Firm*—Griffin & Szipl, P.C.

(57) ABSTRACT

A remote monitoring system which enables the owner and the custodian of a facility to recognize an intrusion from the outside and the owner himself to confirm the details of the intrusion, and which comprises a monitor device (11) for detecting abnormalities of facility and photographing them, and a control server (24) for receiving information from the monitor device (11) to transmit it to mobile terminals (28). The control server 24 (24) comprises an image DB (48) for storing received images in conjunction with the monitor device, a customer/facility specifying unit (44) in the monitor device for specifying mobile terminals carried by customers, and a message preparing unit for preparing messages to be notified to mobile terminals, thereby transmitting messages and contents to mobile terminal (28).

8 Claims, 7 Drawing Sheets

U.S. PATENT DOCUMENTS 6,226,031 B1 * 5/2001 Barraclough et al. .... 348/14.13
6,239,833 B1 * 5/2001 Ozaki et al. ................ 348/159
6,253,064 B1 * 6/2001 Monroe ..................... 455/66.1
6,271,752 B1 * 8/2001 Vaios ......................... 340/541
6,698,021 B1 * 2/2004 Amini et al. ............... 725/105

FOREIGN PATENT DOCUMENTS

WO WO 99/39505 8/1999

* cited by examiner

REMOTE MONITORING METHOD AND MONITOR CONTROL SERVER

This is a National Phase Application in the United States of International Patent Application No. PCT/JP01/05591 filed Jun. 28, 2001, which claims priority on Japanese Patent Application No. 2000/199835, filed Jun. 30, 2000.

TECHNICAL FIELD TO WHICH THE INVENTION BELONGS

The present invention relates to a system capable of remotely monitoring facilities such as homes and offices and, more particularly, to a system capable of monitoring a desired facility in a desired manner by using a mobile terminal.

BACKGROUND ART

In the field of so-called home security for monitoring intruders who are to break into a home and the occurrence of abnormalities in a home (for example, fires and gas leaks), human figure sensors have heretofore been disposed at an entrance, a window and the like of a house, or a temperature sensor and a gas sensor have heretofore been disposed on the ceiling of the kitchen of the house. Signals from the sensors are collected in a communication device disposed somewhere in the home, and the signals are notified from the communication device to the central computer of a security company by using a leased line or a telephone line. For example, in the case where an intrusion from the outside or a fire occurs, signals from the respective sensors are transmitted from the communication device to the central computer of the security company via the leased line or the telephone line. On the basis of information acquired by the central computer, the security company dispatches a person to the home which is a sender, or makes a call to the police or a fire station.

For the security of offices, information from various sensors are similarly transmitted to the central computer of the security company via leased lines.

However, in such a background art remote monitoring system, information of the sensors are exclusively notified to the security company. This leads to the problem that if an intruder is in a facility or an abnormality occurs in the facility, the owner or the custodian of the facility temporarily cannot know the occurrence of the intrusion or the abnormality. As a matter of course, the above-described owner or custodian can know the occurrence of the intrusion or the abnormality through a secondary notice from the security company, but there is considered to be a case where if the owner or the custodian is absent, the security company cannot notify anybody.

An object of the invention is to provide a remote monitoring system which, in spite of a comparatively simple construction, enables the owner and the custodian of a facility to know an intrusion from the outside or the occurrence of an abnormality and also enables the owner himself or the like to confirm the details of the intrusion or the abnormality.

DISCLOSURE OF THE INVENTION

The object of the present invention is achieved by a remote monitoring method constructed to receive information from a monitor device disposed at a predetermined position in a facility and transmit predetermined data to an associated mobile terminal on the basis of the information from the monitor device, the remote monitoring method being characterized by: a step of receiving an image taken by the monitor device in response to abnormality detection made by the monitor device; a step of storing the received image in conjunction with the monitor device; a step of forming as contents at least a predetermined portion of the received image; a step of specifying a mobile terminal carried by a customer of the monitor device; a step of preparing a message to be notified to the mobile terminal; and a step of transmitting to the mobile terminal the message to be notified and, as occasion demands, the contents.

In accordance with the invention, information from a monitor device which monitors a monitor target area of a facility is notified to a mobile terminal of a customer corresponding to the owner or the custodian of the facility. This notification includes a message and, as occasion demands at least a predetermined portion of an image obtained by the monitor device. Accordingly, even if the customer is at any location, the customer can appropriately grasp an abnormality or the like of the facility.

In a preferred embodiment of the invention, the transmitting step has a step of transmitting the message to be notified, as a mail accompanied by an URL address of the contents, and a step of transmitting the contents to the mobile terminal in response to the fact that the mobile terminal which has received the mail gains access to the URL address. That is, the mail notifying the abnormality has been once received and thereafter the contents have been acquired.

In another preferred embodiment of the invention, the contents are made of an image of an approximately central portion of the received image. Accordingly, in a mobile terminal having a very small display device, it is possible to display an image sufficiently recognizable by the customer.

In the above-described case, it is desirable that the remote monitoring method further includes: a step of receiving a remote control instruction from the mobile terminal which has received the contents, the remote control instruction including at least panning a camera; a step of specifying an area according to the panning in the received or stored image, and forming contents made of an image of a corresponding portion; and a step of transmitting the contents to the mobile terminal. According to this embodiment, it is possible to specify the area to which the customer desires to refer from the image according to the panning and to display it to the mobile terminal.

In another preferred embodiment of the invention, the remote monitoring method in which the monitor device is capable of turning on illumination and further includes a step of receiving another remote control instruction from the mobile terminal which has received the contents, the remote control instruction including turning on illumination; a step of transferring the remote control instruction to the monitor device; a step of receiving an image taken with illumination turned on by the monitor device, in response to the remote control instruction; a step of storing the received image in conjunction with the monitor device; a step of forming as contents at least a predetermined portion of the received image; and a step of transmitting the contents to the mobile terminal.

According to this embodiment, the customer can refer to an image in which the status of the facility is far more clearly photographed with illumination turned on.

In yet another preferred embodiment, the remote monitoring method in which the monitor device is capable of generating a warning sound, and further includes: a step of receiving yet another remote control instruction from the mobile terminal which has received the contents, the remote control instruction including generating the warning sound; a step of transferring the remote control instruction to the monitor device; and a step of causing the monitor device to generate the warning sound, in response to the remote control instruction. Accordingly, it can be expected that damage due to a crime can be prevented by warning an intruder from the outside.

Another object of the invention is achieved by a monitor control server constructed to receive information from a monitor device disposed at a predetermined position in a facility and transmit predetermined data to an associated mobile terminal on the basis of the information from the monitor device, the monitor control server including: communication control means for receiving an image taken by the monitor device in response to abnormality detection made by the monitor device and controlling required data exchange with the mobile terminal; an image database for storing the received image in conjunction with the monitor device; image forming means for forming as contents at least a predetermined portion of the received image; customer specifying means for specifying a mobile terminal carried by a customer of the monitor device; and message preparing means for preparing a message to be notified to the mobile terminal. The communication control means is constructed to transmit to the mobile terminal the message to be notified and, as occasion demands, the contents.

In addition, an object of the invention is achieved by a monitor device which can be connected to the monitor control server and cooperates with the monitor control server, the monitor device including: a camera for photographing a predetermined area; video capture means for capturing a photographed video image; and a sensor for detecting an area to be photographed by the camera and an abnormality in an approximately corresponding area in order to specify capture timing for the image. It is desirable that the monitor device be integrally formed. In addition, it is desirable that the monitor device being provided with power control means for activating an illuminating device which illuminates the area to be photographed.

PREFERRED EMBODIMENT FOR CARRYING OUT THE INVENTION

Figure 1:
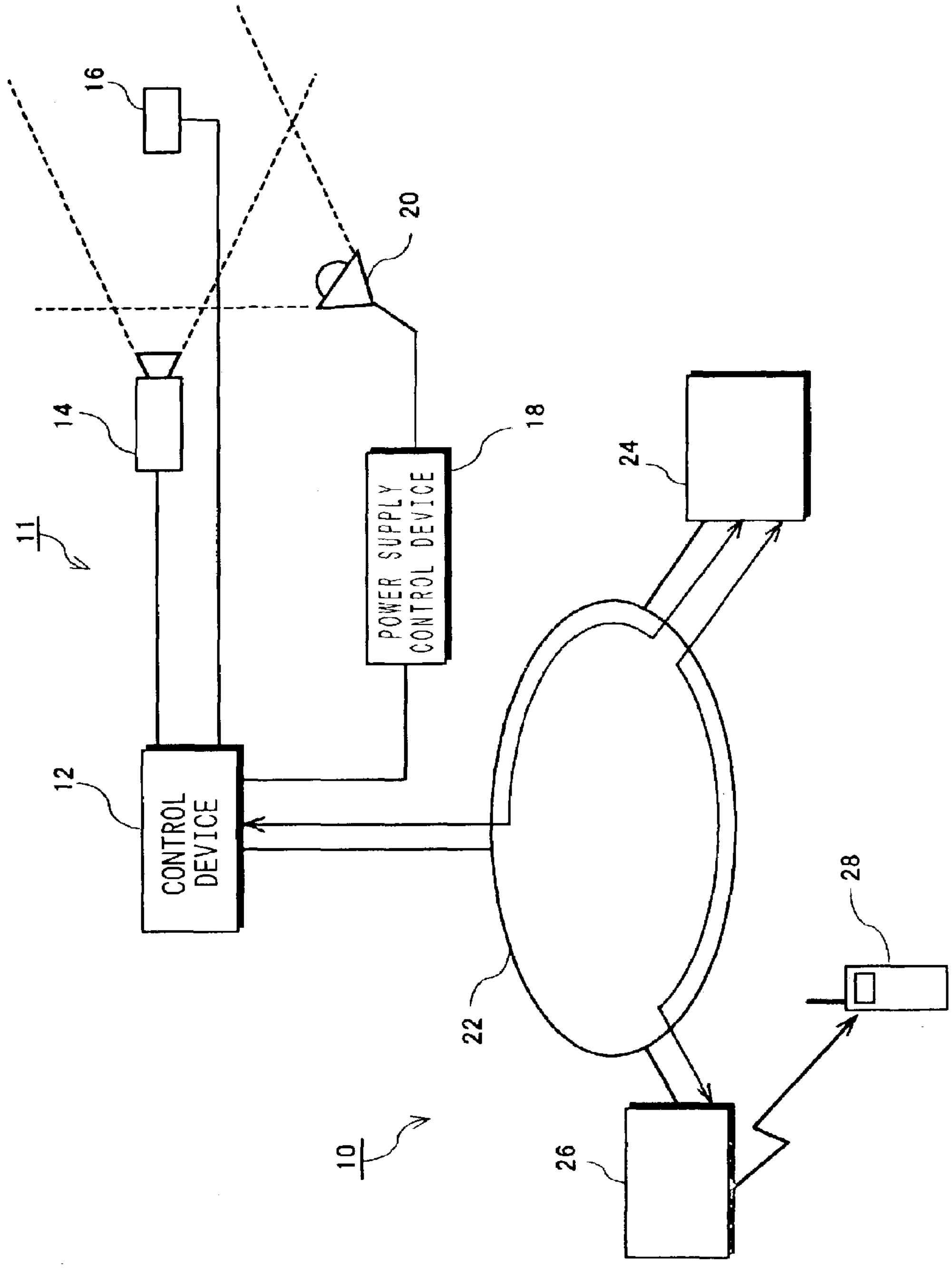
FIG. 1 is a block diagram showing the construction of a remote monitoring system according to an embodiment of the invention.

An embodiment of the invention will be described below with reference to the accompanying drawings. FIG. 1 is a block diagram showing the construction of a remote monitoring system according to the embodiment of the invention. This remote monitoring system is constructed to enable an intruder from the outside to be monitored.

As shown in FIG. 1, in a remote monitoring system 10, a monitor device 11 is disposed in a facility which is a target to be monitored. The monitor device 11 has a control device 12, a CCD camera 14, a sensor 16, a power supply control device 18 and an illuminating device 20. In FIG. 1, the control device 12, the CCD camera 14 and the power supply control device 18 are depicted as separate units, but it goes without saying that these may also be integrally formed. The sensor 14 may use any arbitrary type, such as an infrared sensor, that can detect the presence or absence of an intruder.

The monitor device 11 is also connected to the Internet 22. In addition to the monitor device 11, a control server 24 and a server of a telephone enterprise (telephone enterprise server 26) are connected to the Internet 22. Although FIG. 1 shows a single monitor device, the monitor device 11 is disposed in each facility or monitor area, and a multiplicity of monitor devices 11 can be connected to the Internet 22.

As will be described later, the control server 24 receives a signal from the monitor device 11 and executes the required processing, and transmits data to a mobile terminal 28 via the telephone enterprise server 26. Although FIG. 1 shows a single mobile terminal 28, the single monitor device 11 can use at least one or more mobile terminals 28 as destinations to which to transmit information. Accordingly, in the case where a multiplicity of monitor devices 11 exist, information can be transmitted to a multiplicity of mobile terminals 28 from the control server 24 according to this multiplicity of monitor devices 11.

Figure 2:
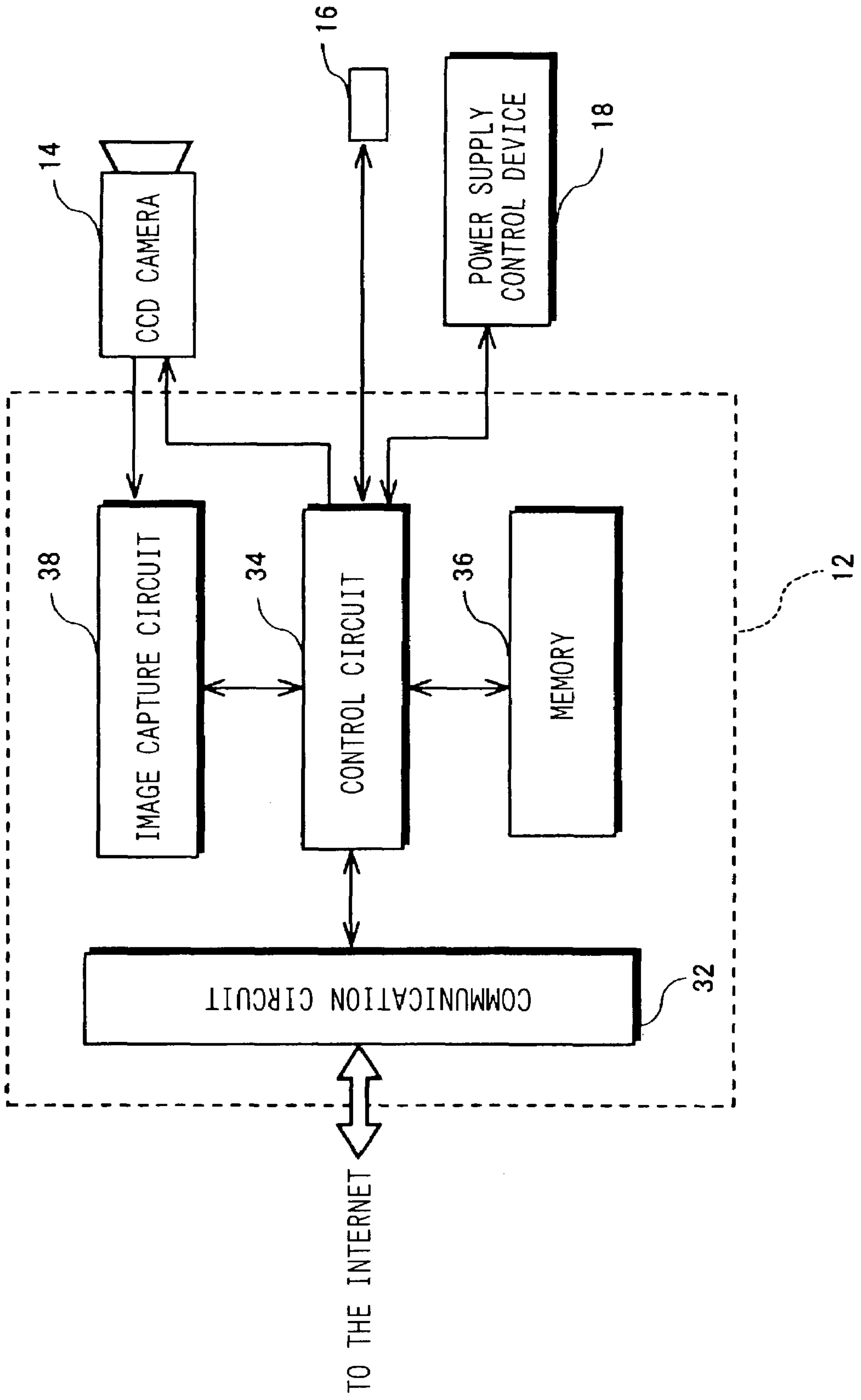
FIG. 2 is a block diagram showing in more detail a monitor device according to the embodiment.

FIG. 2 is a block diagram showing the monitor device 11 in more detail. The control device 12 of the monitor device 11 has a communication circuit 32 which receives data from the Internet 22 and also transmits data to the Internet 22, a control circuit 34 which executes various kinds of processing for controlling the control device 12 itself, the CCD camera 14 and the power supply control device 18, a memory 36 which stores various kinds of data created by processing and a program for operating the control circuit 34, and an image capture circuit 38 which receives an image from the CCD camera 14 and takes out and stores a still image of desired time.

In the case where the control device 12 of the monitor device 11, the CCD camera 14 and the power supply control device 18 are constructed in integral form, this integral construction may be disposed in an indoor predetermined position so that a door and a window can be contained in an image pickup area of the CCD camera 14.

The CCD camera 14 is provided with at least a wide angle lens and desirably has a zoom function. In addition, in the embodiment, the CCD camera 14 is secured to, for example, a ceiling. On the basis of a video signal given from the CCD camera 14, a predetermined still image is taken out by the image capture circuit 38.

Figure 3:
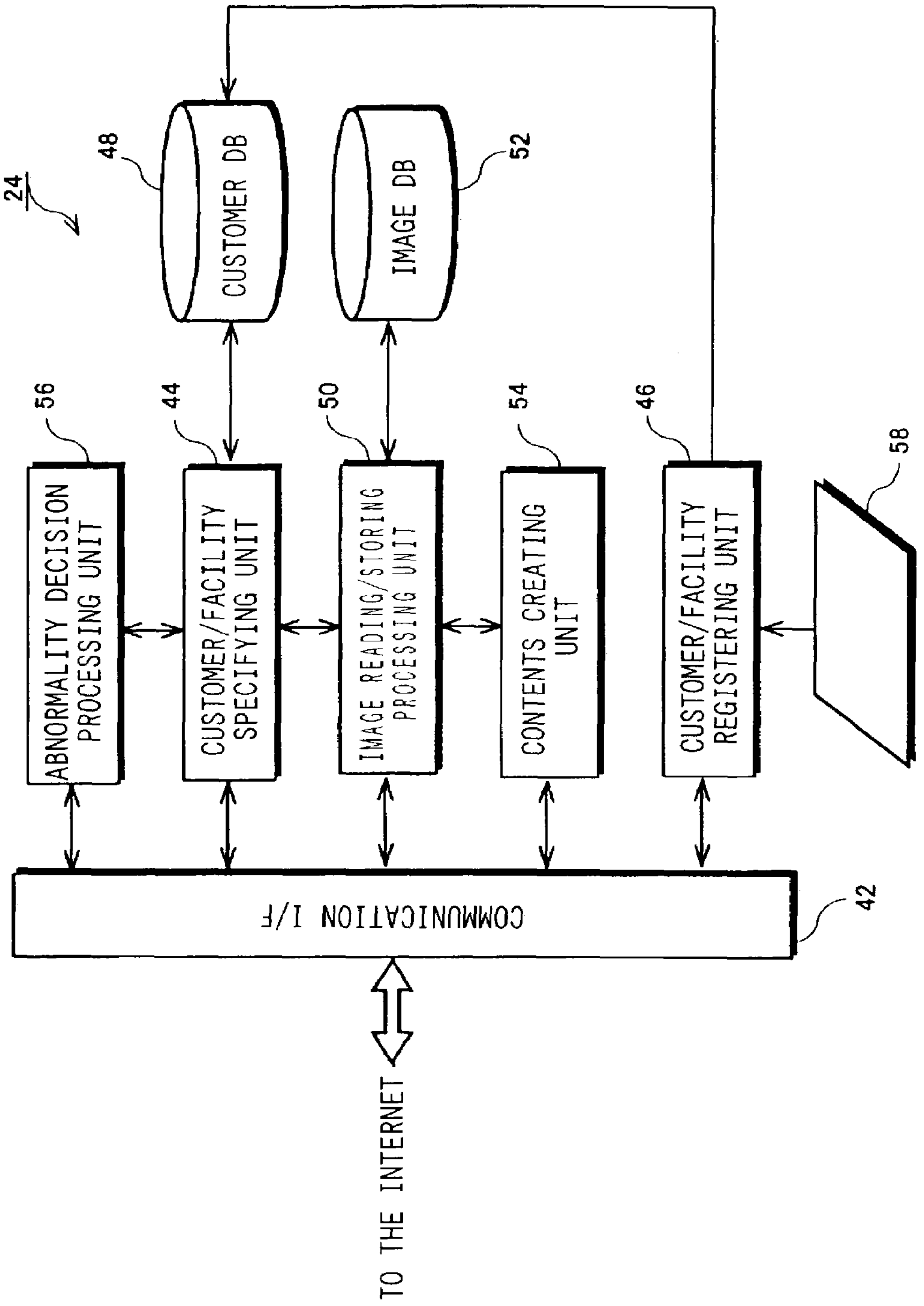
FIG. 3 is a block diagram showing the construction of a control server according to the embodiment.

FIG. 3 is a block diagram showing the construction of the control server 24 according to the embodiment. As shown in FIG. 3, the control server 24 has an communication interface (I/F) 42 which realizes data exchange with the Internet 22, a customer/facility specifying unit 44 which specifies a data sender and a data receiver, a customer/facility registering unit 46 which registers a customer and a facility or the like the monitoring of which is requested by the customer, a customer data base (DB) 48 which stores various kinds of data about the customer and the facility or the like to be monitored, an image reading/storing processing unit 50 which receives an image transmitted from the monitor device 11 and stores this in an image DB 52 and executes the processing of reading stored data when necessary, an image DB 52 which stores image data, a contents creating unit 54 which forms contents (an image) to be transmitted to the customer, an abnormality decision processing unit 56 which makes a decision as to the occurrence of an abnormality on the basis of data from the monitor device 11 and executes the required processing, and an input unit 58 such as a keyboard.

The contents creating unit 54 can carry out the conversion of an image into a format conforming to the kind of mobile terminal in cooperation with the customer/facility registering unit 46.

The communication I/F 42 can execute protocol conversion conforming to the kind of mobile terminal to realize data exchange with the mobile terminal.

In the remote monitoring system 10 constructed in this manner, the customer who is the owner and the custodian of a certain facility transmits to the control server 24 the facility which needs monitoring, the contents of monitor service, the number of the mobile terminal 28 such as the mobile terminal or the PDA of the customer. This transmission may be realized by the input unit 58 being manipulated by an operator of the control server 24 by means of off-line means such as mail service, or a user may transmit the above-described information to the control server 24 via the Internet by using a mobile terminal or a personal computer.

The operator of the control server 24 visits the facility and installs the monitor device 11. The customer/facility registering unit 46 of the control server 24 assigns the customer a customer ID, a password and the like for specifying the customer. These customer ID and password may be sent to the customer by mail or the like. The monitor device 11 is previously assigned a specific device ID. Accordingly, the customer/facility registering unit 46 stores this device ID, service contents and the like in the customer DB 48 in conjunction with the customer ID. The above-described service contents are considered to be the presence or absence of the zoom of a camera, the presence or absence of a light and the like. Accordingly, in view of the above-described service contents, it is desirable to set the monitor device 11 so that the required constituent components can be attached or removed or so that only a function associated with the required service can be activated.

Figure 4:
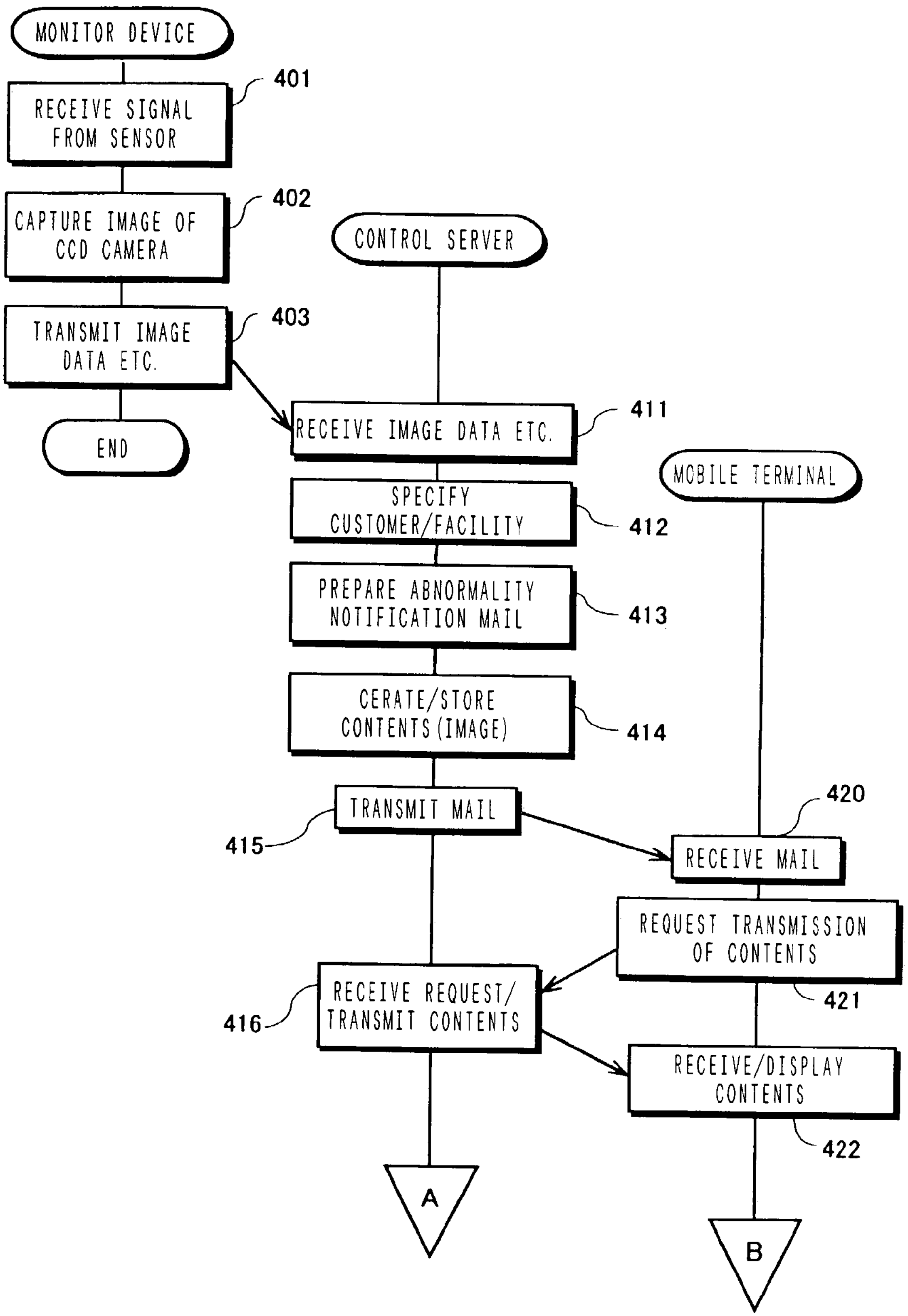
FIG. 4 is a flowchart showing the operation of the monitoring system according to the embodiment.
Figure 5:
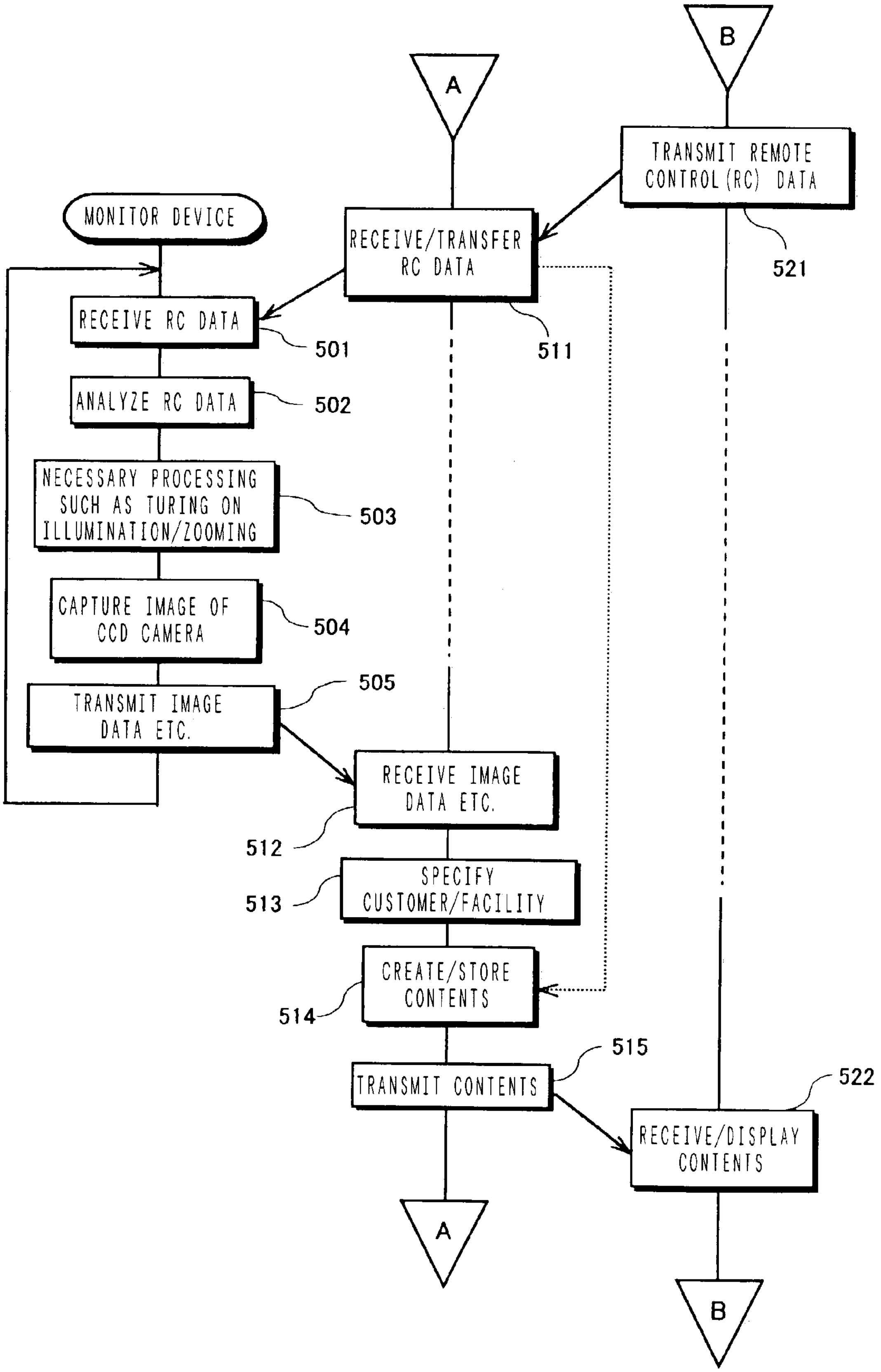
FIG. 5 is a flowchart showing the operation of the monitoring system according to the embodiment.

The operation of the monitoring system 10 constructed in this manner will be described below with reference to FIGS. 4 and 5. In the monitor device 11, when the sensor 16 detects an abnormality and outputs a signal (Step 401), the control circuit 34 gives an instruction to input an image from the CCD camera 14 into the image capture circuit 38. Accordingly, the image capture circuit 38 captures an image of predetermined time instant from a video signal given from the CCD camera 14 (Step 402). The image captured may be a single image or a plurality of images taken at intervals of a predetermined time period.

Then, the control circuit 34 transmits the image data acquired by the image capture circuit together with the device ID which specifies the monitor device 11 to the control server 24 via the communication circuit 32 (Step 403).

When the above-described image data is received by the control server 24 via the Internet 22 (Step 411), the customer/facility specifying unit 44 of the control server 24 searches the customer DB 48 and takes out the required data such as the number of the mobile terminal of the customer on the basis of the attached device ID (Step 412). Then, the abnormality decision processing unit 56 prepares a notification mail indicative of the abnormality (an intrusion from the outside) (Step 413). Then, contents (an image) to be displayed on a display device of the mobile terminal of the user are created on the basis of the received image (Step 414). These received image data and created contents are made conjunct with the customer ID and are stored in a predetermined area of the image DB 52 together with the time of photography, by the image reading/storing processing unit 50.

Figure 6:
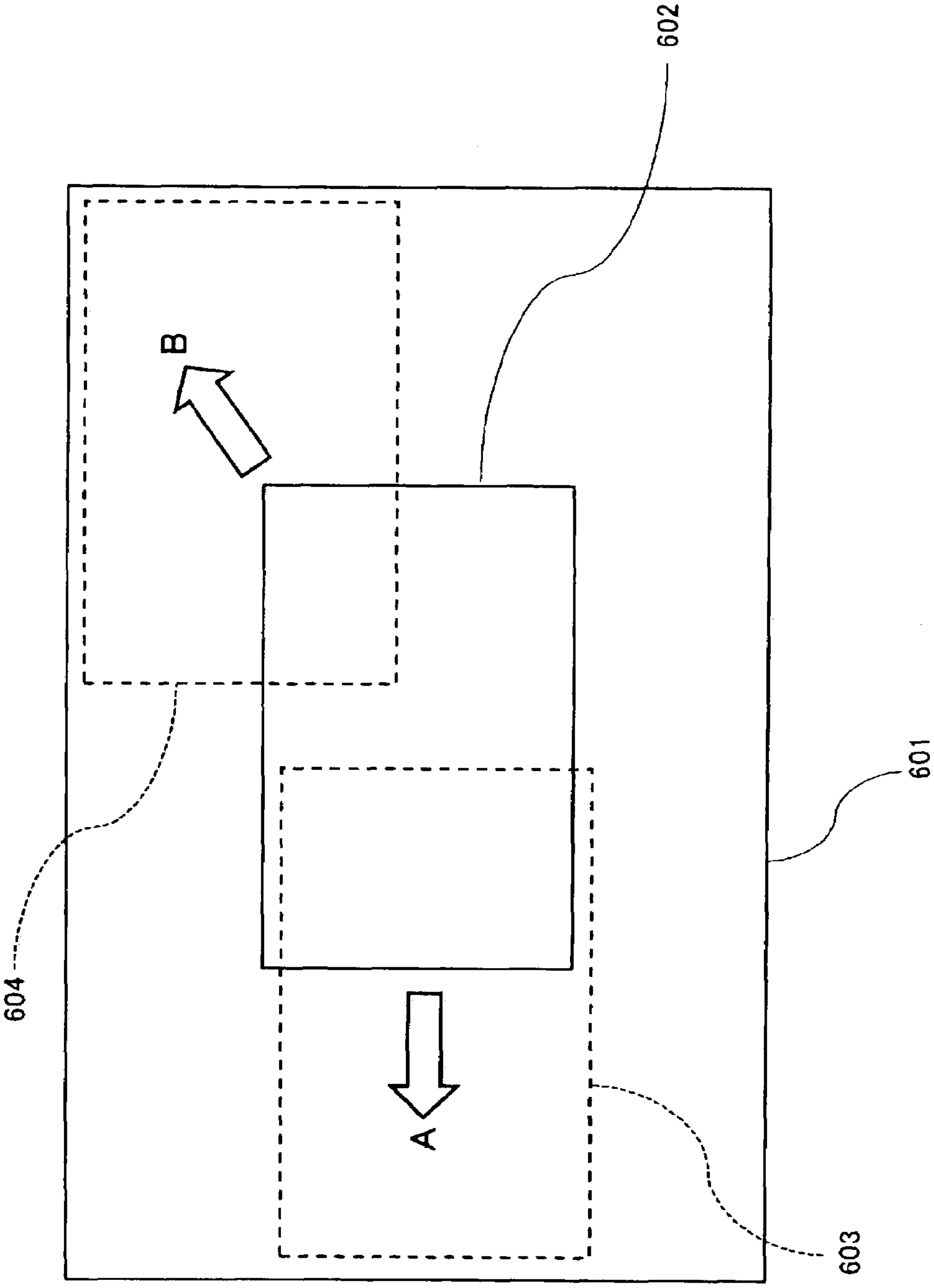
FIG. 6 is a view showing the relationship between a captured image and contents images to be transmitted to a mobile terminal according to the embodiment.

Incidentally, it is desirable that the above-described contents be not the whole image taken at the CCD camera 14 and captured, but an image contained in a predetermined area of the central portion. This is because the display device of the mobile terminal is very small and there is the possibility that when the whole image is displayed, an image incapable of being recognized by the customer may be displayed. For example, as shown in FIG. 6, in a captured image 601, an image contained in an approximately central area 602 is selected as default contents.

After that, a mail is transmitted from the communication I/F 42 to a mobile terminal to be notified (Step 415). This mail is transmitted to the mobile terminal 28 via the telephone enterprise server 26. For example, the transmission of the mail may use artificial terminating call service. Accordingly, the customer who is the user of the mobile terminal 28 can immediately know notification from the control server 24.

Notification indicating that "there is a danger that an intruder from the outside is in your house" and the URL address of the contents are displayed on the screen of the display device of the mobile terminal 28. The user (customer) of the mobile terminal 28 gains access to the control server 24 via the Internet 22 by using the displayed URL and requests the control server 24 to transmit the contents (Step 421). During the access to the control server 24, the control server 24 requests the mobile terminal 28 to input the customer ID and the password, and receives the inputted customer ID and password and authenticates the customer. Then, the control server 24 transmits the contents (image) to the mobile terminal 28 via the Internet 22 (Step 416).

The mobile terminal 28, when it receives the above-described contents, displays the contents on the screen of the display device (Step 422). Accordingly, the user (customer) can refer to the image taken by the CCD camera 14 of the monitor device 11.

For example, there is a case where the user desires to view a more detailed image by zooming the camera, where the user desires to refer to an image in another area by panning the camera, or where the user desires to turn on the illuminating device 20 and clearly confirm an object detected by the sensor 16. For this reason, in the embodiment, information for remotely controlling the monitor device 11 from the mobile terminal 28 is set, and this set information (remote control (RC) data) can be transmitted to the monitor device 11 via the control server 24.

More specifically, when the user manipulates the keys of the mobile terminal 28 and inputs the required information, the RC data is transmitted from the mobile terminal 28 to the control server 24 (Step 521). The RC data received by the control server 24 is transferred to the associated monitor device 11 (Step 511). In this step, the customer/facility specifying unit 44 specifies a facility ID on the basis of the customer ID relative to the mobile terminal 28, whereby the RC data can be transferred to the appropriate monitor device 11. Incidentally, in the case where the RC data merely indicates panning the camera, associated image data may be taken out from the image DB 52 in the control server 24 and an image in an area shifted in any of vertical, horizontal, leftward and rightward directions may be cut out in accordance with the panning instruction, and this image may be used as contents. For example, in FIG. 6, an image in an area 603 panned from the default area 602 in the horizontal direction (in the direction of an arrow A) or an image in an area 604 panned in an oblique direction (in the direction of an arrow B) may be used as contents. In this case, in the control server 24, the process may proceed to the creation of contents (Step 514) without transferring the RC data in Step 511 (refer to a dotted line in FIG. 5).

In the monitor device 11, when the RC data is received (Step 501), the control circuit 34 analyzes the RC data (Step 502) and realizes the required operation (Step 503). This operation includes zooming in/zooming out, turning on/off illumination, and, if the CCD camera 14 is possible, moving (such as rotating) the camera. The image capture circuit 38 takes out a predetermined image from a video signal given from the CCD camera 14 (Step 504). In this step as well, the image captured may be a single image or a plurality of images taken at intervals of a predetermined time period.

After the image has been taken in this manner, image data and the like together with the device ID is transmitted from the communication circuit 32 to the control server 24 via the Internet 22 (Step 505).

In the control server 24, when the image data and the like is received (Step 512), the customer/facility specifying unit 44 specifies the customer ID on the basis of the device ID (Step 513). In the meantime, in the contents creating unit 54, contents (an image) to be displayed on the screen of the display device of the mobile terminal 28 are created on the basis of the received image data (Step 514). For example, in the case where the RC data includes panning in addition to zooming in/zooming out and turning on illumination, an image in an area indicated by panning is cut out of the received image data (refer to FIG. 6). Incidentally, the received image data and the created contents are also stored in a predetermined area of the image DB 52 by the image reading/storing processing unit 50.

Then, the contents are transmitted to the mobile terminal 28 owned by the customer specified in Step 513 (Step 515). In this manner, the image taken by the CCD camera 14 of the monitor device 11 is displayed on the screen of the display device of the mobile terminal 28 (Step 522). Subsequently, as remote control information is further changed at the mobile terminal 28, similar processing is repeated. In this manner, the user can view the desired image.

Accordingly, in the desired manner, the customer can confirm an object detected by the sensor. For example, in the case where the sensor detects that a thing has fallen or an animal has entered, the customer has only to confirm the fact. However, in the case where an intruder from the outside is detected by the sensor, the customer can contact a security company or the police to prevent occurrence of the damage of a crime.

Figure 7:
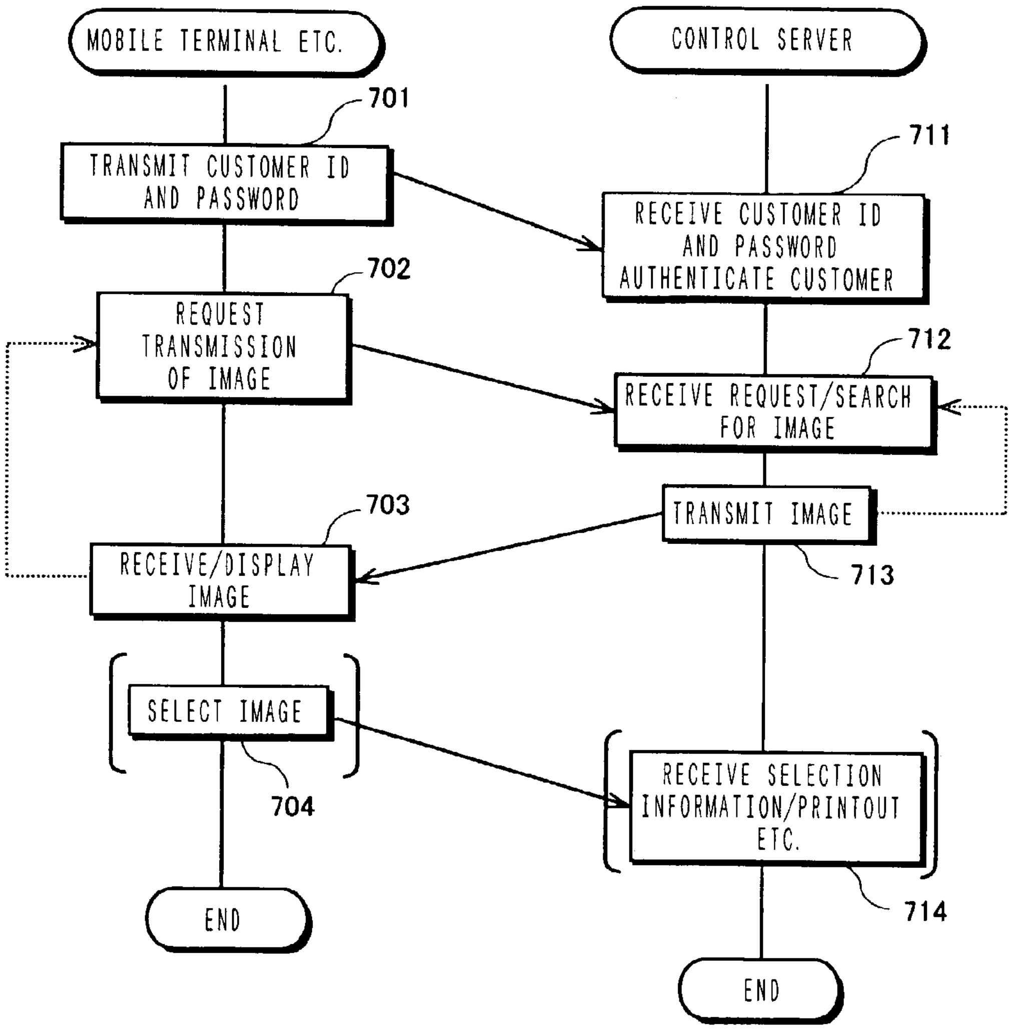
FIG. 7 is a flowchart showing processing associated with taking out an image from the image DB according to the embodiment.

An image of the above-described image DB 52 can be acquired in the desired form at the request of the customer. This is realized, for example, by an instruction being given from the mobile terminal 28 or by an instruction being given from another personal computer. FIG. 7 is a flowchart showing processing associated with taking out an image from the image DB.

When the user (customer) is to gain access to the control server 24 by manipulating the mobile terminal or a personal computer, the user (customer) transmits the customer ID and the password (Step 701). The control server 24 authenticates the customer in response to these (Step 702).

Then, an image transmission request is transmitted from the mobile terminal 28 or the like to the control server 24 (Step 702). This image transmission request includes information which specifies an image desired to be transmitted, such as the date and time of photography of the image. When the control server 24 receives the request, the control server 24 responds to this and search for an image associated with the above-described request in the image DB 52 (Step 712), and transmits the acquired image to the mobile terminal 28 or the like (Step 713). The image received by the mobile terminal 28 or the like is displayed on the screen of the display device (Step 703).

The user (customer) refers to the displayed image, and repeats the procedures of Steps 702 and 703 until the user (customer) obtains the desired image. In the control server 24 as well, the processing of Steps 712 and 713 is repeated (refer to a dotted line in FIG. 7).

For example, in the case where the user finds out the desired image, the user manipulates the mobile terminal or the like to transmit an instruction to select the image to the control server 24 (Step 704). The control server 24 responds to this instruction and executes the required processing such as printing the image (Step 714). Printed matter may be separately delivered to the customer by mail or the like. The above-described Steps 704 and 714 are useful, particularly when the customer is referring to an image through the mobile terminal 28. Otherwise, in the case where the customer is referring to an image through a personal computer or the like, the above-described Steps 704 and 714 may be omitted and an image may be printed out on the side of the customer.

Accordingly, in the following case, it is useful that images taken by the monitor device 11 and transmitted to the control server 24 are stored in the control server 24 so that the user (customer) can refer to a desired one of the images.

It is known that in the case where an intruder enters the facility from the outside, when the user turns on the illuminating device 20 of the facility, the intruder hardly commits larceny in the facility. In other words, turning on the illumination device functions as a kind of warning to the intruder. However, in the case where although the illuminating device is turned on, the intruder does not retreat from the facility and commits destruction or larceny in the facility, the user can submit photographs taken by the above-described monitor device 11 to the required organizations such as the police and an insurance company. Accordingly, the embodiment is also useful for early solution of cases.

The invention is not limited to the above-described embodiment and various modifications can be made within the scope of the invention as defined in the appended claims. It goes without saying that such various modifications are contained in the scope of the invention.

For example, in the embodiment of the invention, an abnormality notification mail is sent from the control server 24 to the mobile terminal 28, and then contents (image) are transmitted in accordance with a request from the mobile terminal 28 (refer to Steps 413 to 416 and 420 to 422 of FIG. 3). However, the invention is not limited to this construction, and if possible, an abnormality notification mail may also be transmitted to the user together with an image.

In addition, in the above-described embodiment, a video signal by the CCD camera is captured by using a detection of the sensor as a trigger, this video signal is transmitted to the mobile terminal 28 via the control server 24, but the invention is not limited to this construction. For example, in FIG. 5, the remote control information may also include an instruction to cause the CCD camera to capture an image. In this case, the customer can manipulate the mobile terminal 28 to cause the mobile terminal to receive an image from the CCD camera via the control server 14 and display this image on the screen of the display device.

Furthermore, in the above-described embodiment, an infrared sensor has been used as the sensor 16 by way of example, but it goes without saying that other sensors (such as temperature sensors and other detecting sensors) can also be used. Otherwise, the sensor 16 may not be used, and the CCD camera 14 itself may also be used as a sensor. In this case, the CCD camera 14 constantly picks up an image, and an abnormality may also be detected on the basis of a variation in an image due to the photography of a human figure or the like.

In addition, in the above-described embodiment, a buzzer may be connected to the power supply control device 18 of the monitor device 11 so that the buzzer sounds in response to the RC data from the mobile terminal 128. Accordingly, it is possible to further increase a warning effect on intruders from the outside.

Moreover, in the above-described embodiment, the CCD camera 14 is provided with a wide angle lens and the CCD camera 14 itself is fixed, but the CCD camera 14 is not limited to this construction. For example, the CCD camera 14 may be of a movable type which is rotatable about its axis of rotation.

According to the invention, it is possible to provide a remote monitoring system which, in spite of a comparatively simple construction, enables the owner and the custodian of a facility to know an intrusion from the outside or the occurrence of an abnormality and also enables the owner himself or the like to confirm the details of the intrusion or the abnormality.

INDUSTRIAL APPLICABILITY

The invention can be used to monitor various places such as homes and offices, and can also be used to enable an owner or a custodian to monitor the desired section from the desired place.

The invention claimed is:

1. A remote monitoring method constructed to receive information from a monitor device disposed at a predetermined position in a facility and transmit predetermined data to an associated mobile terminal on the basis of the information from the monitor device, the method comprising:

a step of receiving via a network an image taken by the monitor device in response to abnormality detection made by the monitor device;

a step of storing in a database the received image in conjunction with the monitor device;

a step of forming as contents at least a predetermined portion of the received image by reading out the received image from the database, wherein the contents initially comprise an image of an approximately central portion of an image read out from the database;

a step of specifying a mobile terminal carried by a customer of the monitor device;

a step of preparing a message to be notified to the mobile terminal; and a step of transmitting to the mobile terminal the message to be notified and, as occasion demands, the contents;

a step of receiving a remote control instruction from the mobile terminal that has received the contents, wherein the remote control instruction includes at least instruction to pan a camera;

a step of specifying an area according to panning in the stored image in the database by shifting the area in the image, and forming contents made of an image of a portion corresponding to the specified area; and a step of transmitting the contents to the mobile terminal.

2. A remote monitoring method according to claim 1, characterized in that the transmitting step has:

a step of transmitting the message to be notified, as a mail accompanied by an URL address of the contents; and a step of transmitting the contents to the mobile terminal in response to the fact that the mobile terminal which has received the mail gains access to the URL address.

3. A remote monitoring method according to claim 1, in which the monitor device is capable of turning on illumination, further characterized by further comprising:

a step of receiving another remote control instruction from the mobile terminal which has received the contents, the remote control instruction including turning on illumination;

a step of transferring the remote control instruction to the monitor device;

a step of receiving an image taken with illumination turned on by the monitor device, in response to the remote control instruction;

a step of storing the received image in conjunction with the monitor device;

a step of forming as contents at least a predetermined portion of the received image; and a step of transmitting the contents to the mobile terminal.

4. A remote monitoring method according to claim 1, in which the monitor device is capable of generating a warning sound, characterized by further comprising:

a step of receiving yet another remote control instruction from the mobile terminal which has received the contents, the remote control instruction including generating the warning sound;

a step of transferring the remote control instruction to the monitor device; and a step of causing the monitor device to generate the warning sound, in response to the remote control instruction.

5. A monitor control server constructed to receive information from a monitor device disposed at a predetermined position in a facility and transmit predetermined data to an associated mobile terminal on the basis of the information from the monitor device, the monitor control server comprising:

communication control means for receiving via a network an image taken by the monitor device in response to abnormality detection made by the monitor device and controlling required data exchange with the mobile terminal;

an image database for storing in a database the received image in conjunction with the monitor device;

image forming means for forming as contents at least a predetermined portion of the received image by reading out the received image from the database, wherein the contents initially comprise an image of an approximately central portion of an image read out from the database;

customer specifying means for specifying a mobile terminal carried by a customer of the monitor device; and message preparing means for preparing a message to be notified to the mobile terminal, wherein the communication control means is constructed to transmit to the mobile terminal the message to be notified and, as occasion demands, the contents, and to receive a remote control instruction from the mobile terminal, which instruction includes at least panning a camera, wherein the image forming means specifies an area according to panning in the image stored in the image database or the received image by shifting the area in the image, and contents formed by the image forming means comprise an image of a portion corresponding to the specified area, wherein the communication control means transmits the contents formed by the image forming means to the mobile terminal.

6. A monitor device connected to a monitor control server according to claim 5 and cooperates with the monitor control server, the monitor device comprising:

a camera for photographing a predetermined area;

video capture means for capturing a photographed video image; and a sensor for detecting an area to be photographed by the camera and an abnormality in an approximately corresponding area in order to specify capture timing for the image.

7. A monitor device according to claim 6, characterized in that the monitor device is integrally formed.

8. A remote monitoring method constructed to receive information from a monitor device disposed at a predetermined position in a facility and transmit predetermined data to an associated mobile terminal on the basis of the information from the monitor device, the method comprising the steps of:

receiving via a network an image taken by the monitor device in response to abnormality detection made by the monitor device;

storing in a database the received image in conjunction with the monitor device;

forming as contents of a first image at least a predetermined portion of the received image by reading out the received image from the database, wherein the contents initially comprise an image of an approximately central portion of an image read out from the database;

specifying a mobile terminal carried by a customer of the monitor device;

preparing a message to be notified to the mobile terminal; and transmitting to the mobile terminal the message to be notified and, as occasion demands, the contents of the first image;

receiving a remote control instruction from the mobile terminal that has received the contents, wherein the remote control instruction includes at least instruction to pan a camera;

specifying an area according to panning in the stored image in the database by shifting the area in the image, and forming contents made of an image of a portion corresponding to the specified area; and transmitting the contents to the mobile terminal.

* * * * *